Aug. 11, 1959   J. MAROSI   2,899,025
VEHICLE PARKING BRAKE
Filed Oct. 4, 1956   3 Sheets-Sheet 3
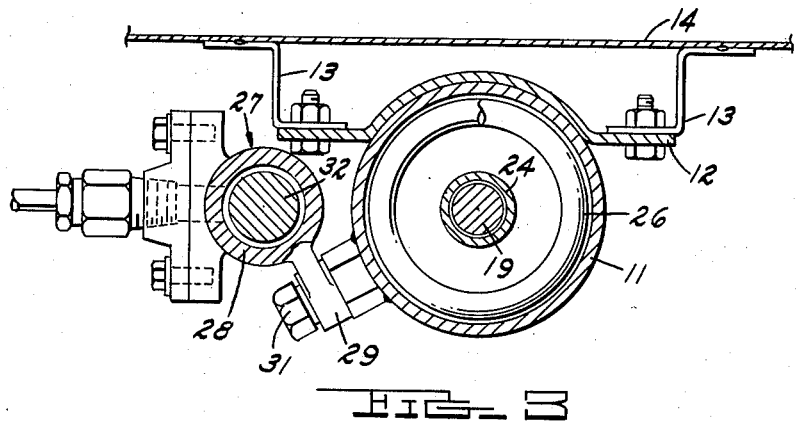
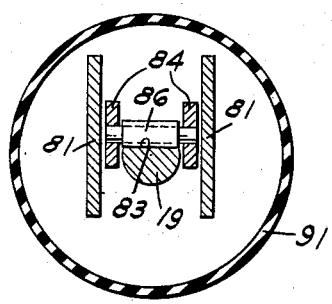
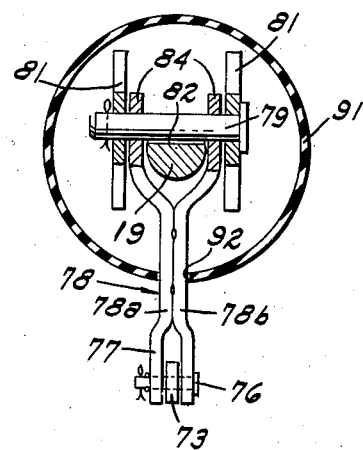
J. MAROSI
INVENTOR.
BY E. C. McRAE
J. R. FAULKNER
T. H. OSTER
ATTORNEYS United States Patent Office 2,899,025
Patented Aug. 11, 1959

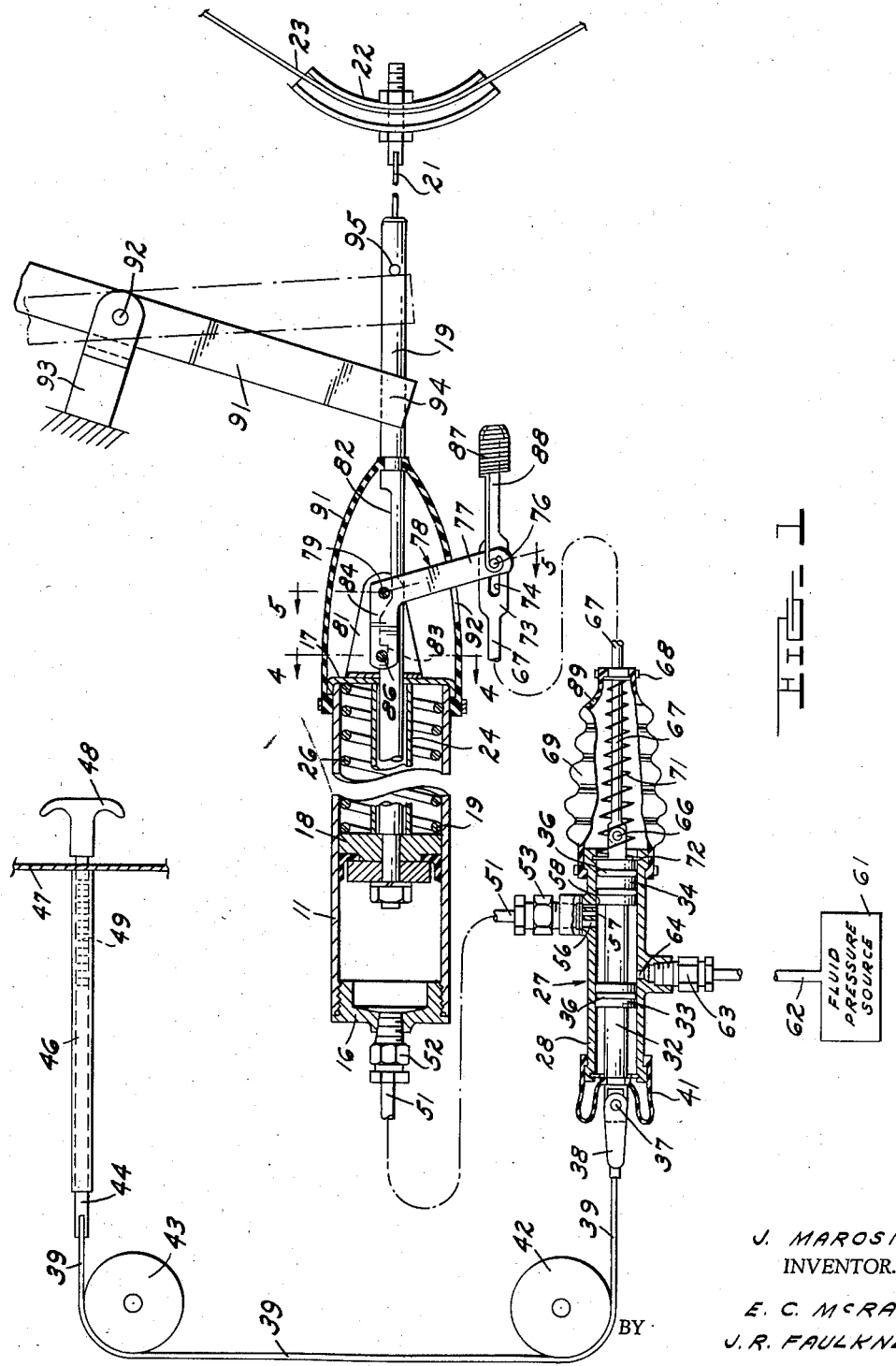

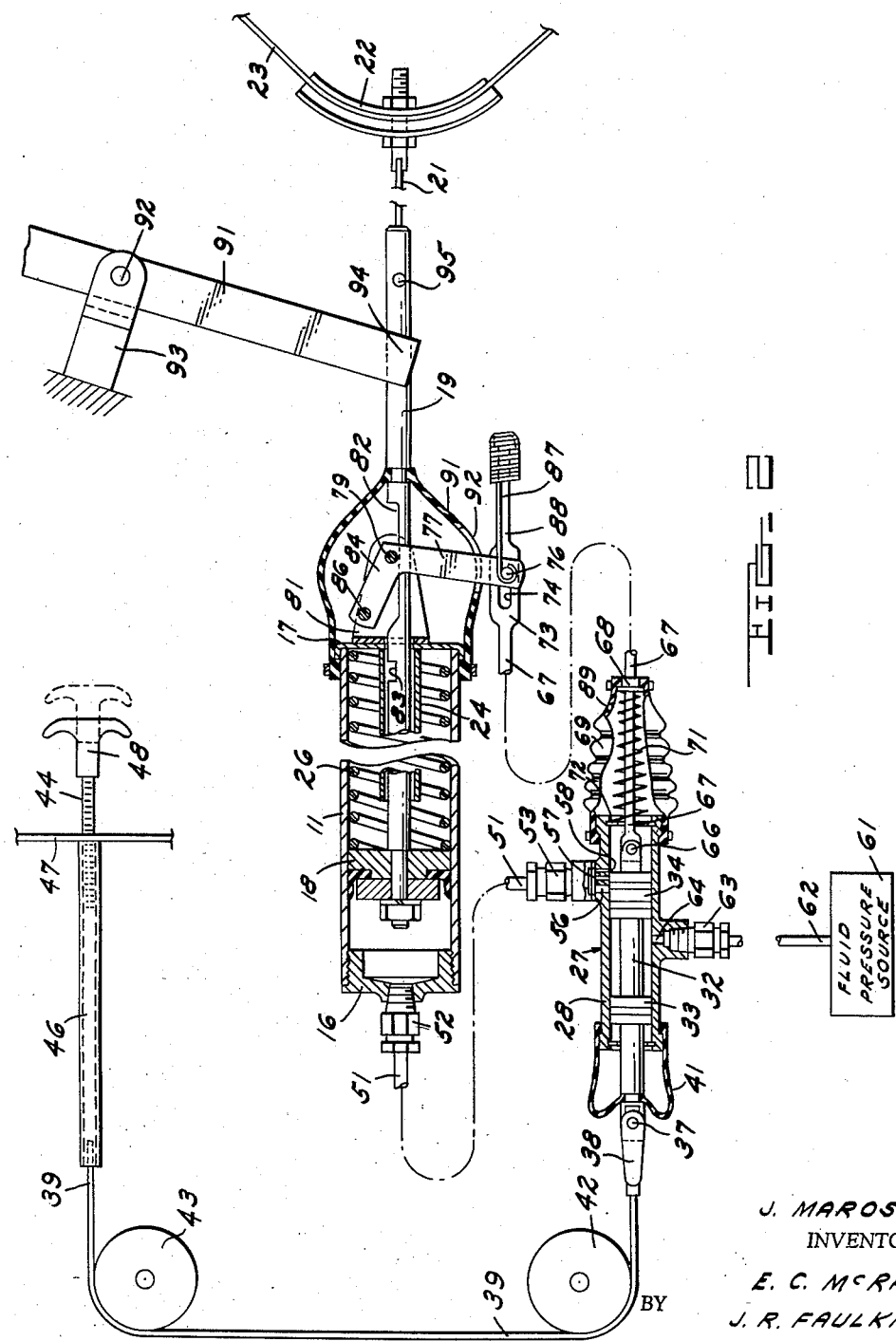
J. MAROSI
INVENTOR.
E. C. McRAE
J. R. FAULKNER
T. H. OSTER
ATTORNEYS

2,899,025

VEHICLE PARKING BRAKE

Jess Marosi, Farmington, Mich., assignor to Ford Motor Company, Dearborn, Mich., a corporation of Delaware Application October 4, 1956, Serial No. 613,927

1 Claim. (Cl. 188—170)

This invention relates generally to parking brakes for motor vehicles, and particularly to control mechanism for applying motor vehicle parking brakes.

An object of the present invention is to provide a parking brake control mechanism for a motor vehicle permitting the vehicle parking brake to be applied by power means controlled by a manual control requiring but little effort to operate.

A further object of the invention is to provide a power operated control mechanism for a vehicle parking brake which utilizes mechanical power to apply the brake and fluid power to preload the mechanical power.

Still another object of the invention is to provide power actuated control mechanism for a vehicle parking brake utilizing mechanical power to control the application of the brake and fluid power to control the release of the mechanical power, and incorporating a safety latch preventing inadvertent operation of the parking brake in the event of failure of the fluid system, with the safety latch being automatically operable.

In an embodiment of the invention a piston is reciprocably mounted within a cylinder and is connected to the parking brake actuating means. A coil spring is arranged to move the piston brake applying direction, and is normally held in brake released position by means of fluid pressure opposing the spring action, and also by means of a mechanical safety latch. A manual control operates a three-way valve having connections to a fluid pressure source, to the cylinder, and to exhaust. Operation of the valve by the manual control connects the cylinder to the exhaust to release the fluid pressure therein and enable the coil spring to apply the parking brake. Means are provided for varying the rate of brake application in accordance with the movement of the manual control. A safety latch is provided to prevent inadvertent application of the parking brake by the spring in the event of failure or leakage of the fluid portion of the system. The safety latch is operatively connected to the manual control and the valve in such manner as to enable it to be released immediately prior to the operation of the valve to release fluid pressure from the cylinder to permit the brake to be applied by the spring.

Other objects and advantages of this invention will be made more apparent as this description proceeds, particularly when considered in connection with the accompanying drawings, wherein:

Figure 1 is a semidiagrammatic view, partly in section, of the present invention, with the mechanism shown in brake release position.

Figure 2 is a semidiagrammatic view similar to Figure 1 but showing the mechanism in brake applying position.

Figure 3 is an end elevation of the cylinder and valve construction, partly broken away and in section.

Figures 4 and 5 are enlarged transverse cross sectional views taken on the lines 4—4 and 5—5 of Figure 1.

Referring now to the drawings, the reference character 11 indicates a cylinder suitably secured by means of brackets 12 and 13 to a structural frame member 14 of the motor vehicle. The opposite ends of the cylinder are closed by end caps 16 and 17, and a piston 18 is reciprocably mounted within the cylinder. The piston is secured to the end of a piston rod 19 slidably extending through the end cap 17.

The outer end of the piston rod 19 is connected by means of a cable 21 to an arcuate equalizer bracket 22 slidably receiving a cable 23 the opposite ends of which are operatively connected to the rear wheel parking brakes (not shown) of the vehicle in conventional fashion.

A sleeve 24 surrounds the piston rod 19 within the cylinder and forms a spacer limiting movement of the piston 18 to the right and determining the brake released position of the piston 18, piston rod 19, and brake equalizer 22.

A relatively heavy helical coil spring 26 is contained within the cylinder 11 between the piston 18 and the end wall 17, and in the brake released position of the piston as shown in Figure 1 is compressed and applies a force tending to move the piston to the left toward brake applying position.

A fluid control valve 27 is provided for controlling the admission to and exhaust of fluid from the portion of the cylinder 11 between the end wall 16 and the piston 18. The valve 27 comprises a valve body 28 having an integral flange 29 (Figure 3) rigidly connected to the side of the cylinder 11 by means of bolts 31. A valve spool 32 having a pair of axially spaced lands 33 and 34 is reciprocably mounted within the valve body 28. Sealing rings 36 are carried by the lands 33 and 34.

The left hand end of the valve spool 32 projects beyond the end of the valve body 28 and is pivotally connected at 37 to a clevis 38 carried at the end of a flexible cable 39. A flexible boot 41 between the valve body 28 and the valve spool 32 seals the end of the valve. The flexible cable 39 extends around pulleys 42 and 43 and its opposite end is connected to a plunger 44 slidably mounted within a guide member 46 carried by the instrument panel 47. A manual control handle 48 is connected to the outer end of the plunger 44 and suitable conventional ratchet means 49 are incorporated between the plunger 44 and the guide 46 to enable the handle to be held at selected positions.

Communication is established between the cylinder 11 and the valve 27 by means of a conduit 51 connected by means of a fitting 52 to the end cap 16 of the cylinder and by means of a fitting 53 to the valve body 28. The valve body 28 is formed with a series of graduated ports 56, 57 and 58 establishing communication between the conduit 51 and the interior of the valve body 28.

A fluid pressure source 61, which may be of any conventional type such as a fluid pump, accumulator or reservoir, is connected by means of a conduit 62 and a fitting 63 to a port 64 in the valve body 28.

It will be noted that in the brake released position of the control mechanism as shown in Figure 1, the valve spool 32 is positioned within the valve body 28 in such location that the graduated ports 56—57—58 and the pressure port 64 are between the spaced lands 33 and 34. Fluid pressure is thus directed by the valve 27 from the source 61 to the cylinder 11 to oppose movement of the piston 18 by the coil spring 26. The pressure supplied by the source 61 is sufficient to overcome the coil spring and to hold the piston against the end of the sleeve 24 so that the brake will be in released position.

The right-hand end of the valve spool 32 projects from the valve body 28 and is pivotally connected at 66 to a rod 67 extending generally axially. A collar 68 is carried by the rod 67 and supports one end of a flexible boot 69 the opposite end of which is connected to the end of the valve body 28. A return spring 71 surrounds the plunger 67 between the collar 68 and a retaining ring 72 contained within the valve body at the right-hand end thereof. The retainer ring also serves as a stop for the valve spool and it will be seen that the return spring 71 normally holds the valve in the brake released position shown in Figure 1.

The plunger 67 is formed near its opposite end with an enlarged flat 73 formed with a slot 74. As best seen in Figures 1 and 5, the slotted flat portion 73 of the rod 67 is connected by means of a pin 76 to the lower arm 77 of a safety latch 78 in the form of a bell crank lever. The safety latch 78 is pivotally mounted at 79 upon the bifurcated flanges of a bracket 81 carried by the end cap 17 of the cylinder 11.

The safety latch 78 is formed of two complementary halves 78a and 78b welded together in an intermediate area and spaced from each other adjacent opposite ends to straddle both the flat portion 73 of the rod 67 and the piston rod 19. The piston rod 19 is formed with a depressed groove 82 to provide clearance for the pivot pin 79 of the latch, and also with a groove 83 forming a keeper portion on the piston rod.

The safety latch 78 has a second arm 84 carrying at its forward end a pin 86 adapted to be received within the keeper groove 83 in the piston rod. A coil spring 87 is connected to the pivot pin 76 at the lower end of the arm 77 of the latch and has its opposite end carried by an extension 88 of the rod 71 to constantly urge the latch 78 in a counterclockwise direction.

A flexible boot 91 has its opposite ends connected to the cylinder 11 and the piston rod 19 to provide a seal for the safety latch mechanism and the right-hand end of the cylinder and piston assembly. A slot 92 is provided in the lower portion of the boot for the passage of the arm 77 of the safety latch.

*Operation*

In the brake released position shown in Figure 1, the manual control knob 48 is in the brake-off position enabling the valve return spring 71 to hold the valve spool 32 against the retaining ring 72 and providing communication between the fluid pressure source 61 and the left-hand end of the cylinder 11. The fluid pressure overcomes the spring 26 and holds the piston against the stop provided by the sleeve 24. At the same time, the safety latch 78 is spring urged by the coil spring 87 to the position shown in which the latch pin 86 is seated within the keeper groove 83 in the piston rod 19. It will be seen that the safety latch prevents the piston 18 from being moved to the left under the action of the coil spring 26 in the event of leakage or failure of any part of the fluid portion of the system, thus preventing an inadvertent brake application.

To apply the parking brake the manual control 48 is withdrawn by the operator, moving the valve spool 32 to the left. The initial movement of the valve spool and the interconnected rod 67 swings the safety latch 78 in a clockwise direction about its pivotal mounting 79 to lift the latch pin 86 from the keeper groove 83 in the piston rod 19. Continued actuation of the manual control knob 48 moves the valve spool 32 to the left so that the land 34 thereof will cover the ports 56, 57 and 58 leading to the cylinder 11. When these ports have been covered, communication between the fluid pressure source 61 and the cylinder 11 is interrupted, trapping a body of fluid within the cylinder 11. Subsequent actuation of the manual control knob 48 moves the valve spool 32 further to the left until the land 34 uncovers the port 58 in the valve body, as shown in Figure 2. This establishes communication between the cylinder 11 and the right-hand end of the valve body 28. Since the valve body opens into the boot 69 and since the boot 69 is provided with exhaust ports 89, this establishes communication between the cylinder 11 and exhaust, permitting the fluid pressure within the cylinder 11 to be exhausted and permitting movement of the piston 18 to the left under the action of the preloaded coil spring 26. This moves the brake equalizer 22 and brake cable 23 to apply the parking brake.

If the manual control knob 48 is moved from the position shown in full lines in Figure 2 to the position shown in dotted lines, the valve spool 32 will be moved to the left to uncover the ports 57 and 56 in that order. The uncovering of additional ports accelerates the rate of discharge of the fluid from the cylinder 11 enabling a faster brake application to be effected under the action of the coil spring 26. The parking brake may thus be applied rapidly or slowly, the rate of brake application being dependent upon the movement of the control knob 48.

To release the parking brake after it has been thus applied, the manual control knob 48 is moved inwardly to return the valve spool to a position first closing the ports 56, 57 and 58 to exhaust and subsequently opening these ports to the port 64 from the fluid pressure source 61. The admission of fluid pressure to the cylinder moves the piston 18 to the right against the coil spring 26 to release the parking brake and again load the coil spring 26 so that its stored energy will be available for a subsequent brake application. The brake return springs (not shown) return the brake cable 23, equalizer 22, piston rod 19 and piston 18 to the position shown in Figure 1.

At the same time, the return movement of the valve spool 32 effects a corresponding return movement of the rod 71 to release the safety latch 78 and permit it to be moved by the coil spring 87 in a counterclockwise direction. The latch pin 86 of the safety latch rides against the upper surface of the piston rod 19 until it engages the keeper groove 83 to again provide a safety feature.

In the event of leakage or failure of the fluid portion of the system at a time when the parking brakes are applied, a lever 91 is provided to enable the piston rod and piston to be moved against the coil spring to a brake release position. The lever 91 is pivoted at 92 to a bracket 93 carried by the vehicle and is formed with a bifurcated lower end 94 straddling the piston rod 19 and adapted to engage a pin 95 after a predetermined movement.

Although the embodiment of the invention shown is particularly designed for use with air pressure, it will be understood that the invention may also employ other types of fluid pressure for the control and power medium.

It will be understood that the invention is not to be limited to the exact construction shown and described, but that various changes and modifications may be made without departing from the spirit and scope of the invention, as defined in the appended claim.

What is claimed is:

Control mechanism for a motor vehicle parking brake having an actuating member, comprising a cylinder mounted upon the vehicle, a piston reciprocable within said cylinder, a piston rod connected to said piston and projecting from one end of said cylinder, means connecting the projecting end of said piston rod to said brake actuating member, a coil spring within said cylinder surrounding said piston rod and urging said piston and piston rod in brake applying direction, a source of fluid pressure, a valve housing having a cylindrical bore therein, said valve housing being mounted upon said cylinder at one side thereof with the axes of said cylinder and said valve bore being parallel to each other, a valve spool reciprocably mounted in said valve bore and having an axially extended land thereon, a spring urging said valve to a retracted position, said valve bore having a connection to said fluid pressure source at the forward side of said valve spool land and a connection to exhaust at the rearward side of said valve spool land, said valve housing also having a plurality of axially spaced radially extending ports intersecting said valve bore forwardly of said valve spool land in the retracted position of said valve spool, a conduit interconnecting said brake cylinder and said ports to supply fluid under pressure to said cylinder when the valve spool is in its retracted position, manually operable control means to advance said valve spool against the action of said spring progressively first to a position in which said valve spool land covers said ports and then to positions successively uncovering said ports and establishing communication between said ports and exhaust to relieve the pressure in said cylinder and permit said piston and interconnected brake actuating member to be moved in brake applying direction by said coil spring, an abutment on the projecting end portion of said piston rod, a safety latch mounted upon said cylinder, spring means normally holding said safety latch in engagement with said abutment to prevent inadvertent application of said brake, a bell crank lever pivotally mounted upon said cylinder to release said safety latch, and a rod having one end connected to said valve spool and its opposite end connected to said bell crank lever to move said safety latch out of engagement with said abutment simultaneously with the movement of said valve spool by said manually operable means in a direction to relieve the pressure in said brake cylinder.

References Cited in the file of this patent

UNITED STATES PATENTS

| | | |
|---|---|---|
| 1,272,263 | Hooker | July 9, 1918 |
| 1,555,350 | Bolin | Sept. 29, 1925 |
| 1,770,717 | Stremberger | July 15, 1930 |
| 1,792,895 | Cowlishaw | Feb. 17, 1931 |
| 2,330,739 | Piron | Sept. 28, 1943 |
| 2,335,533 | Reavis | Nov. 30, 1943 |

FOREIGN PATENTS

| | | |
|---|---|---|
| 393,244 | Great Britain | 1933 |